June 6, 1967     J. H. JACOBS     3,324,478
OSCILLOGRAPIC RECORDING WITH COHERENT LIGHT
Filed Jan. 29, 1965
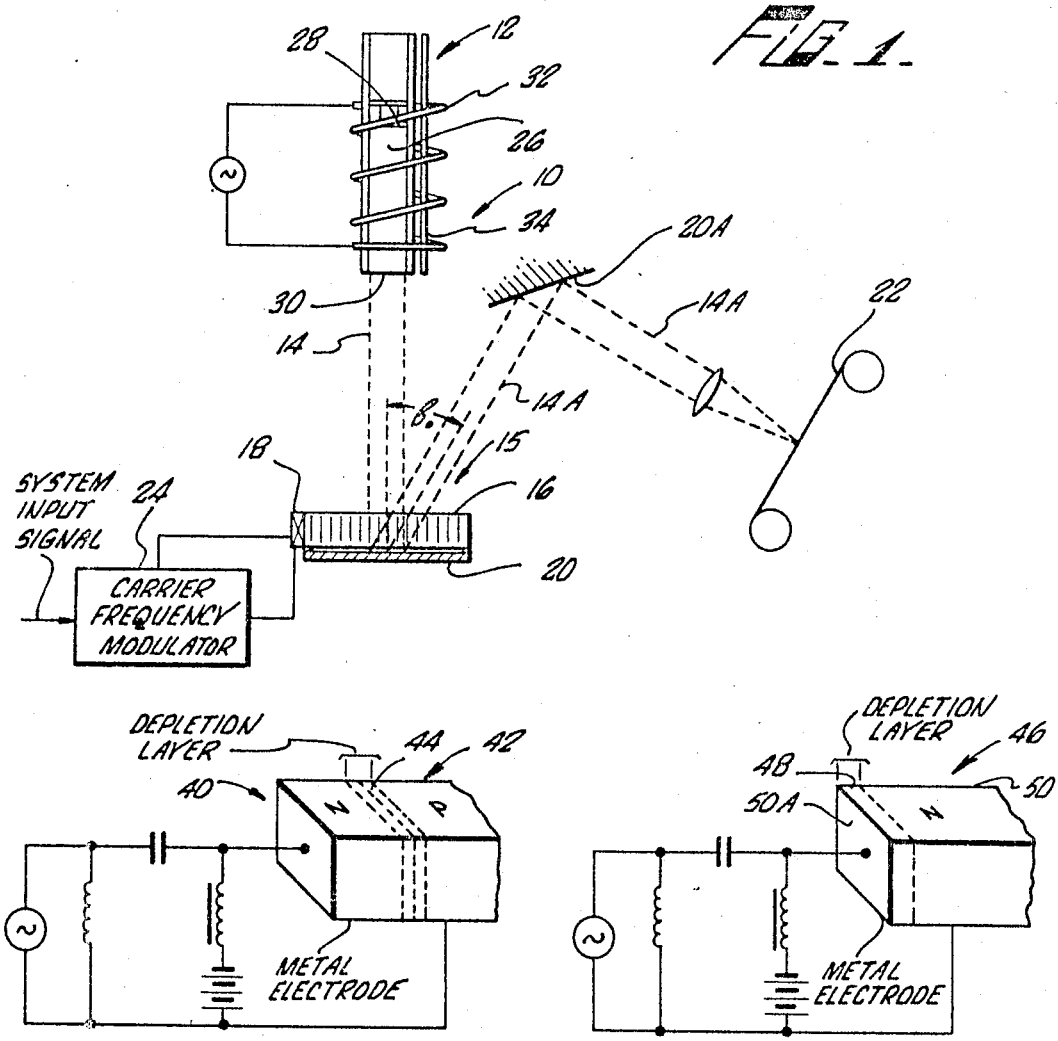
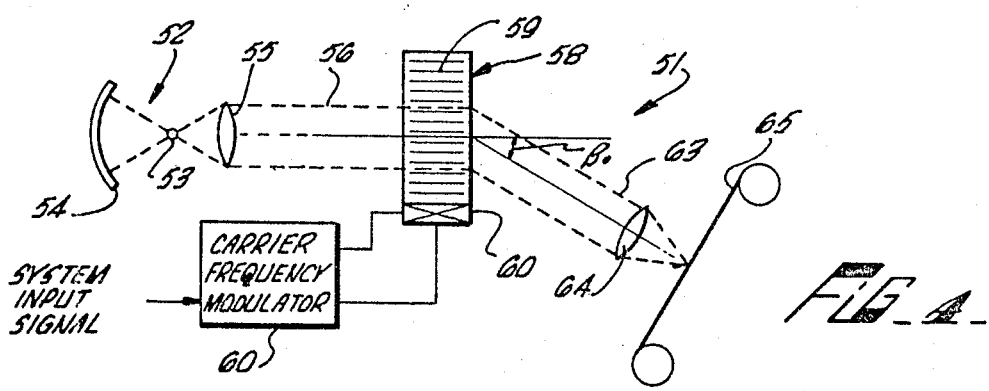

3,324,478
OSCILLOGRAPHIC RECORDING WITH COHERENT LIGHT
John H. Jacobs, Altadena, Calif., assignor to Bell & Howell Company, Chicago, Ill., a corporation of Illinois
Filed Jan. 29, 1965, Ser. No. 429,008
11 Claims. (Cl. 346—108)

ABSTRACT OF THE DISCLOSURE

A light-beam-recording oscillograph wherein the light source emits a beam of coherent light that is deflected in proportion to the value of an input signal by passage of the beam through a body of liquid that has its diffraction constant varied in proportion to the input signal by a sonic transducer attached thereto and modulated in response to the signal.

---

This invention relates to sensing and recording information signals, the values of which vary at frequencies up to the megacycle range. More particularly, this invention relates to high frequency oscillography.

Conventional optical oscillographs rely upon the combination of a conventional galvanometer and a conventional light source. The galvanometer includes a lightweight fine wire coil held in suspension between a pair of stretched wires or ribbons, respectively, anchored at opposite ends of an enclosing case. The wire or ribbon defines the axis of rotary motion of the coil and supports a small mirror which is disposed symmetrically about the wire as an axis. A beam of light from the light source is focused upon the mirror through a window in the galvanometer case. Movement of the coil produces movement of the mirror, thereby deflecting the light beam incident upon the mirror. The deflected light beam is directed to a light sensitive moving recording medium upon which is recorded variations in the value of the signal applied to the galvanometer coil. The signal applied to the galvanometer coil is the input signal to the oscillograph.

One of the limitations of the conventional optical oscillograph is the inability of the galvanometer to accurately respond to variations in input signal frequency above 13 kilocycles. The inherent mechanical problems of inertia and friction in the conventional galvanometer prevent higher frequency response even if radically different configurations and structures are considered.

This invention eliminates the mechanical limitations found in a conventional galvanometer and includes a means for increasing the accuracy and frequency response in a sensing and recording system such as an oscillograph. The invention is best adapted for use in an optical oscillograph capable of operating at 5 megacycles. In such an oscillograph, the conventional light source and galvanometer are replaced by a laser and a diffraction grating, having a variable diffraction constant, in the laser cavity. The diffraction grating is operated so that a portion of the coherent light produced by the laser is emitted from the laser at an angle which varies in proportion to the value of an information input signal supplied to the oscillograph. The diffraction grating is an ultrasonically energized body of liquid; the frequency at which sound waves are propagated through the liquid is varied to alter the diffraction constant of the grating. The diffraction image is focused upon a moving light sensitive recording medium as in conventional oscillographs.

Generally speaking, this invention provides a recording system including means for generating a beam of collimated light rays. A body of liquid is provided together with means coupled thereto for generating ultrasonic sound waves in the liquid body. The beam of collimated light rays is passed through the body of liquid and diffraction images of the beam are produced as the beam passes through the liquid body. The system further includes a moving sensitive recording medium and means for directing at least one of the diffraction images of the beam to the moving medium. In a presently preferred embodiment of the invention, means for varying the frequency of the sound waves in accordance with variations in the value of a system input signal is coupled to the sound wave generating means. Preferably the sound wave generating means is a depletion layer transducer in which the resonant frequency of the transducer is varied in accordance with variations in the value of the input signal. Also, it is preferred that the light source be an injection laser.

The term "laser," as used in this specification, is an acronym for light amplification by stimulated emission of radiation. The active component of the laser may be any gas, crystal, semi-conductor or other light emitting source used in a laser known in the art.

The term "light rays," as used in this specification, refers to any form of radiant energy in a visible or invisible wave band and extends to infrared and ultraviolet rays.

The term "record," as used in this specification, refers to any recording medium or register which is used as evidence of an event or occurrence. The record may be light sensitive or heat sensitive.

The present invention is more fully described in the following detailed description presented in conjunction with the accompanying drawings in which:

FIG. 1 is a schematic view of a recording system according to this invention;

FIG. 2 is a schematic arrangement of a depletion layer transducer arranged with a metal electrode and acting as a resonant transducer;

FIG. 3 is a schematic view of a depletion layer transducer arranged with a semi-conductor contact acting as a resonant transducer; and FIG. 4 is a schematic view of another embodiment of the present invention using a more conventional light source with an ultrasonic diffraction grating to deflect light emitted from the light source toward a moving record.

It has been known for many years that light may be diffracted by passing it through a liquid traversed by ultrasonic waves. The diffraction phenonmenon is quite similar to the diffraction produced by light passing through an ordinary ruled optical grating. In studying this phenomenon, it has been found that light waves passing through an ultrasonically energized body of fluid are acted upon by the sound waves in such a manner that the velocity change in the light enhances only the phase but not the amplitude of the light exchange. Hence, if the light wave passes through an ultrasonically energized body of fluid at right angles to the direction of sound propagation, the sound waves act on the light as a phase grating.

Referring now to FIG. 1, a sensing and recording system 10 includes a light source in the form of a laser 12 emitting a beam of parallel coherent light rays 14 toward a diffraction grating 15 which includes a liquid body 16. Coherent light is inherently collimated light. An ultrasonic transducer 18 is coupled to the liquid body and generates sound waves which move through the liquid body so that the fronts of the sound waves are parallel to light rays 14. The grating is so constructed that the sound waves are absorbed after traversing the liquid from the transducer and are not reflected back through the liquid. The light rays passing through the body of liquid are deflected by optical diffraction. A diffracted light beam 14A is reflected by a first mirror 20 adjacent the liquid body. Beam 14A contains the light which produces one of the two first order diffraction images of beam 14. A second mirror 20A is spaced from the liquid body and directs light beam 14A to a moving record 22 where the image of the beam is recorded. Mirror 20A may be deleted from the structure of the invention if angle $\beta$ between light beams 14 and 14A is sufficiently great that light beam 14A can pass beyond laser 12.

Transducer 18 normally is operated at a characteristic or carrier frequency related to the value of angle $\beta_0$. Angle $\beta_0$ is the angle between beam 14 and beam 14A corresponding to the normal or "no information" value of an input signal to the system. Angle $\beta_0$ can be chosen to be any convenient angle desired. If the liquid body is water in which the velocity of sound is 1460 meters per second and if the light in beam 14 has a wavelength of 6500, and if it is desired that angle $\beta_0$ be 45°, the ultrasonic carrier frequency generated in the liquid body by transducer 18 is 1588 megacycles.

Diffraction grating 15 includes a carrier frequency modulator 24 coupled to transducer 18. The system input signal is applied to the modulator. The modulator is so constructed that the frequency of the characteristic signal produced by the transducer 18 is modulated in proportion to the value of the system input signal. Modulator 24 contains circuitry similar to the circuitry which is used to modulate the carrier signal produced in FM radio broadcasting, for example. As the carrier frequency of the sound waves produced in liquid body 16 is modulated, the diffraction constant of the grating is altered proportionally. As the diffraction constant of the grating is altered, the light rays associated with the first order diffraction images of beam 14 emerge from the grating at an angle $\beta$ which differs from angle $\beta_0$ by an amount proportional to the value of the system input signal. The system input signal may be a voltage produced by any conventional sensing mechanism such as the voltage produced as the output signal of a piezoelectric accelerometer, for example.

It will be understood that several diffraction images of images of beam 14 may be produced by grating 15, particularly if the sound waves generated by the transducer are produced at several frequencies. Even if the sound waves define a pure tone, first order diffraction images will be produced on opposite sides of beam 14. Only one of these images is used in the structure illustrated since the optics required to combine both images would produce a 50% loss in the light delivered to record 22.

Laser 12 includes a crystal 26 that has a fully reflective end 28 and an opposite end that is either partially reflective or non-reflective. Both ends 28 and 30 are polished optically flat and parallel. The crystal is disposed within a powerful electronic helical flash tube to provide an intense source of pumping light. A trigger electrode 34 is disposed along the crystal and is used to aid in the production of a cascade of photons within the crystal. An envelope (not shown) is disposed around the crystal and has a coolant, such as liquid nitrogen, passing therethrough to reduce thermal excitation in the crystal and to increase the excitation time. In the usual manner, pumping light from the flash tube is turned on and photons are reflected back and forth in the crystal parallel to the longitudinal axis of the laser. These protons move back and forth in the crystal between silvered end 28 of the crystal and mirror 20, which mirror forms a part of the laser itself, until a cascade of photons is stimulated in the crystal. The cascade culminates in a coherent beam of light which flashes through non-reflective end 30 of the crystal to mirror 20. The major portion of the light in the coherent beam is reflected back into the crystal by mirror 20 to continue the laser action in the crystal. Only that portion of the coherent beam associated with the diffraction images is not returned to the crystal.

Laser 12 differs from the conventional crystal laser which has one end fully reflective and the other end partially reflective. In the conventional laser, none of the light in the coherent beam passing through the partially reflective end of the crystal is returned to the crystal to continue the laser action.

It is preferred that laser 12 operate continuously, although it is within the scope of this invention to operate the laser in a pulsed mode. Some of the known materials which may be used for continuous laser operation are chromium using aluminum oxide as the host material, neodymium using various fluorides as the host material, molybdates with glass, dysprosium with calcium fluoride, or uranium with various fluorides. The invention also includes the use of gas discharge lasers, such as helium, neon, krypton, xenon, carbon monoxide, oxygen, or some of the semi-conductors such as gallium arsenide, indium phosphide, or indium arsenide.

Diffraction grating 15 and reflector 20 are both disposed within the laser cavity. The term "cavity" when used with lasers denotes the space between the fully reflecting and the partially reflecting mirror of the laser. In the structure described above, however, mirror 20 performs the function of the partially silvered end of the crystal in a conventional laser since it reflects a principal portion of the light reflected from fully reflecting end 28 of the crystal back into the crystal. For this reason, it is said that mirror 20 and diffraction grating 15 are located in the laser cavity. Reflector 20 is disposed parallel to crystal end surfaces 28 and 30. The drawings show reflector 20 as defining one boundary of the liquid body, but the reflector may be spaced from the ultrasonically energized body of liquid if desired.

In a presently preferred embodiment of the invention, transducer 18 is a depletion layer transducer operating at microwave frequencies, preferably at about its resonant frequency. The depletion layer transducer behaves in a manner similar to an extremely thin piezoelectric crystal bonded to a conducting substrate when an AC voltage is applied to the material. One advantage in using a depletion layer transducer is that the problems of ultra-thin piezoelectric plates are avoided since the depletion layer can be generated on the surface of a semi-conductor. The depletion layer transducer has operated at frequencies as high as 830 megacycles and should be capable of operating between 300 megacycles and 10,000 megacycles. A more conventional piezoelectric transducer can be used, but such transducers cannot be operated at frequencies as high as a depletion layer transducer can be operated.

The depletion layer in a semi-conductor is a region in which the mobile carrier charge density is insufficient to neutralize the net fixed charge density of donors and acceptors. This transducer is analogous to the piezoelectric crystal when used as a transducer. This type of transducer is a relatively new ultrasonic device, and its characteristics and uses are described in an article entitled "Depletion Layer Transducer—A New High Frequency Ultrasonic Transducer," by Donald L. White, 1961, I.R.E. International Convention Record, volume 6, page 304.

Referring now to FIG. 2, one form of a depletion transducer 40 is shown as a semi-conductor 42 that has a P-N junction 44 which is reverse biased. When the semi-conductor 42 is of a low resistivity, almost all of DC voltage drop occurs at the junction. Since the junction is thin, the electric field in that region is large. When the semi-conductor is piezoelectric, a large DC electric field creates a significant stress, and the depletion layer 45, but not the remainder of the semi-conductor, is elastically strained. Since fields of the order of $10^7$ volts per meter are not uncommon in depletion layers, large strains are possible. As an AC signal is superimposed on the DC bias, and when the resistance of the semi-conductor is small compared to the impedance of the junction capacitance, most of the AC voltage drop will be across the junction. Thus, the alternating stress is produced within depletion layer 45 and the wave motion produced there is radiated into the semi-conductor.

Referring now to FIG. 3, an alternate type of depletion layer transducer 46 includes a depletion layer 48 formed by a rectifying metal and semi-conductor contact disposed on a semi-conductor 50. The depletion layer 48 is disposed between N-type semi-conductor material 50 and a metal electrode 50A. When reverse biased in a conventional manner as illustrated in FIG. 3, the depletion layer 48 is formed in the N-type material 50 under the metal electrode 50A. A very thin layer of P-type semi-conductor can be substituted for the metal electrode.

When the transducers, as illustrated in FIGS. 2 and 3, are used in combination with liquid body 16, illustrated in FIG. 1, the resonant frequency of the transducer extends from about 300 megacycles to about 10,000 megacycles when the depletion layer is very thin, say at $10^{-3}$ to $10^{-5}$ centimeters. Thus, under normal conditions, the transducer is resonant and all the input electrical energy is converted to an ultrasonic energy output that forms ultrasonic sound waves in the body of fluid.

The resonant frequency of the transducers in FIGS. 2 and 3, is controlled by the DC bias. A reversed bias almost at the breakdown voltage of the semi-conductor would correspond to the lowest resonant frequency.

The operation of the invention as illustrated in FIG. 1 is as follows. The crystal 26 is pumped by the flash tube 32 until the photons are travelling precisely parallel and are reflected back and forth between the ends of the laser cavity. The laser 12 preferably is operated continuously and while most of the radiation is reflected in the zero order back into the laser cavity from mirror 20, thus providing the required feedback, some of the radiation comes out at an angle mostly in the first order in accordance with optical diffraction. The diffracted light rays are reflected by reflector 20 at an angle $\beta$. $\beta$ may be calculated in accordance with the formula $n\gamma = d \sin \beta$. Where $n$ equals the order, $\gamma$ equals the wave length, and $d$ is the grating constant. The moving record 22 intercepts the deflected rays of light 14A. As the system input signal varies, the frequency modulator 24 operates to modulate the ultrasonic sound waves generated by the transducer 18. The beam of light rays 14 is constantly diffracted at different angles in accordance with the changes in frequency of the ultrasonic sound waves.

In a presently preferred embodiment of the invention, the laser 12 is continuously operated, the beam of light 14 is continuous and will be recorded as a constant line at the moving record 22. The record 22 must naturally be sensitive enough to respond to extremely high writing speeds.

FIG. 4 shows another sensing and recording system 51 including a source 52 of collimated light. Source 52 includes a lamp 53, a reflector 54 and an objective lens 55 which cooperate to produce a beam 56 of parallel or collimated light rays. Beam 56 is passed through a diffraction grating which includes a body of liquid 59, an ultrasonic transducer 60 for generating in the liquid body sound waves of a characteristic frequency, and a frequency modulator 61 coupled to the transducer for modulating the frequency of the sound waves generated in body 59 in proportion to the value of a system input signal applied to the modulator. Light passing through the ultrasonically energized liquid is diffracted and deflected as described above to produce a deflected beam 63 which is focused by a lens 64 on a moving light sensitive record 65. The amount of deflection between beams 56 and 63 is proportional to the value of the system input signal. While system 51 is not as effective as system 10 for high frequency variations in the value of the system input signal because of the lower intensity of lamp 53 as compared to a laser, it still constitutes an advance over conventional systems, such as optical oscillographs which rely upon galvanometers, since the mechanism used for deflecting the light beam is inertialess.

The invention has been described above by reference to presently preferred embodiments thereof and those persons skilled in the art to which the invention relates will realize that this structure can be altered without departing from the scope and spirit of the invention. Accordingly, the foregoing description as it relates to specific configurations and combinations of apparatus is not to be considered as limiting the scope of the invention.

What is claimed is:
1. An oscillograph comprising:
 (a) a source of light emitting a beam of collimated coherent light,
 (b) a variable diffraction constant diffraction grating deflecting at least a portion of the light in the light beam proportionally to variations in the value of an input signal applied to the oscillograph including
  (i) a body of liquid through which the light beam passes,
  (ii) transducer means coupled to the liquid body for generating in the body sound waves which move through the body and which waves have a characteristic frequency, and
  (iii) modulating means coupled to the transducer means and responsive to the input signal for modulating the characteristic frequency proportional to variations in the input signal so that said beam is deflected an amount proportional to said input signal variations, and
 (c) a sensitive record disposed to receive the deflected portion of the light beam for recording said input signal variations.

2. An oscillograph according to claim 1 wherein the transducer means is arranged so that the sound waves move through the liquid body normal to the light beam.

3. An oscillograph according to claim 1 wherein the transducer means is arranged so that the sound waves move through the liquid body transverse to the light beam.

4. An oscillograph according to claim 1 wherein the transducer means is a depletion layer transducer.

5. An oscillograph comprising:
 (a) a source of light emitting a beam of collimated coherent light,
 (b) a variable diffraction constant diffraction grating deflecting at least a portion of the light in the collimated light beam proportionally to variations in the value of an input signal applied to the oscillograph including
  (i) a body of liquid disposed transversely of the collimated light beam and through which the beam passes,
  (ii) ultrasonic transducer means coupled to the liquid body for generating in the body sound waves which move through the body normal to the collimated beam and which waves have a characteristic frequency, and
  (iii) modulating means coupled to the transducer means and respective to the input signal for modulating the characteristic frequency proportional to variations in the input signal so that said collimated beam is deflected an amount proportional to said input signal variations, and
 (c) a sensitive record disposed to receive the deflected portion of the collimated beam for recording said input signal variations.

6. An oscillograph comprising:
 (a) a laser having a laser cavity defined by two spaced fully reflecting mirrors arranged parallel to each other, for reflecting a beam of coherent light therebetween,
 (b) a variable diffraction constant diffraction grating within the laser cavity and including
  (i) a body of liquid disposed transversely of the coherent beam through which the beam passes,
  (ii) transducer means coupled to the liquid body for generating in the body sound waves which move through the body transverse to the light beam and which have a characteristic frequency for deflecting a portion of the light in the beam from the path of the beam at a selected angle, and (iii) modulating means coupled to the transducer means for varying said characteristic frequency in proportion to variations in an oscillograph input signal applied thereto to vary the angle of deflection of said portion of the light beam, and (c) a sensitive record disposed to receive the deflected light for recording said input signal variations.

7. An oscillograph according to claim 6 wherein the transducer means is arranged so that the sound waves move through the liquid body normal to the collimated beam.

8. An oscillograph according to claim 6 wherein the transducer means is a depletion layer transducer.

9. An oscillograph according to claim 6 wherein the laser includes a crystal having a reflective end defining one fully reflective end and an opposite end parallel to the reflective end, the other fully reflective mirror being spaced from said other end of the crystal.

10. An oscillograph comprising:
a laser emitting a beam of light rays and including a cavity having a crystal with one reflective and one non-reflective end and a reflector spaced from the laser crystal non-reflective end and disposed normal to the beam,
a body of liquid aligned with the laser and disposed between the crystal and the reflector,
a transducer coupled to the liquid body for generating sound waves moves through the liquid body transverse to the beam for deflecting the beam, and
a movable light sensitive record arranged to intercept the deflected beam.

11. An oscillograph for receiving an input information signal and for recording variations thereof comprising:
a laser emitting a beam of coherent light rays and including a cavity having a crystal with one reflective end and one non-reflective end and a reflector spaced from the laser crystal non-reflective end and disposed normal to the beam,
a body of liquid disposed between the crystal and the reflector so that the beam passes through the body to the reflector,
a depletion layer transducer coupled to the liquid body for generating ultrasonic waves in the liquid body which move through the body transversely of the beam for deflecting at least a portion of the beam,
means coupled with the transducer for varying the frequency of the ultrasonic waves in accordance with the input information signal, and
a movable light sensitive record arranged to intercept the deflected light rays of the beam.

References Cited
UNITED STATES PATENTS

| | | | |
|---|---|---|---|
| 2,084,201 | 6/1937 | Karolus | 88—61 |
| 2,153,490 | 4/1939 | Wikkenhauser et al. | 88—61 |
| 2,155,659 | 4/1939 | Jeffree | 88—61 |
| 2,578,601 | 12/1951 | Rosenthal | 88—61 |
| 3,259,014 | 7/1966 | Johnson et al. | 88—61 |

RICHARD B. WILKINSON, *Primary Examiner.*

STEPHEN J. TOMSKY, *Examiner.*

J. W. HARTARY, *Assistant Examiner.*